UNITED STATES PATENT OFFICE 2,140,531

CADMIUM ALLOY SOLDERS

Richard R. Kennedy, Dayton, Ohio

No Drawing. Application November 26, 1937,
Serial No. 176,622

5 Claims. (Cl. 75—134)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to the use of cadmium alloys for solders and the method of making the same.

Alloys of lead and tin have long been used as solders for joining various metals and possess many advantages, but when used at elevated temperatures, they become very weak due to their low melting point. Such solders are found to be impracticable when used for soldering aircraft or automobile radiator shells wherein ethylene glycol is used as the cooling liquid. Under certain conditions in the use of ethylene glycol, the temperatures thereof approach its boiling point, approximately 386 degrees Fahrenheit, and are in the melting point range of common solders. The shearing strength of ordinary tin-lead solder at about 350 degrees Fahrenheit is found to be reduced to approximately one-sixth of its normal strength so that the soldered joints are easily broken or damaged by the stresses to which the radiator is subject under normal operating conditions. In order to overcome this difficulty, I have discovered a new solder having high shearing strength at elevated temperatures in the range of 350 degrees Fahrenheit. For this purpose, I have provided a solder with cadmium as the basic constituent. Whereas the ordinary tin-lead solders having a fusing point of about 360 degrees Fahrenheit, my solder has a fusing point range, depending on various compositions, of from 600 degrees Fahrenheit to 820 degrees Fahrenheit or higher, and is therefore adapted for use where higher temperatures are encountered.

My solder is made by alloying with cadmium, small amounts of silver, nickel, copper or combinations of these three elements in percentages within the solubility range of the alloying element. No regard for chemical purity need be exercised as in addition to these elements the solders may or may not contain other elements which occur as impurities in the commercial metals used in making the alloy.

Due to the low boiling point of cadmium, (approximately 1435 degrees Fahrenheit) the usual methods of preparation of alloys can not be used. For instance, the method of melting the constituent metals of alloy and pouring the higher melting metal or metals into the lower melting metal—in this case, cadmium—is inapplicable as silver, copper, and nickel melt above the boiling point of cadmium and if one of these metals in a molten condition is poured into the molten cadmium, the cadmium is violently expelled from the pot and may catch fire and burn. Also, the method of melting the cadmium and adding the higher melting metal in a solid form and heating until the higher melting metal has dissolved, is inapplicable unless special precautions are taken, as cadmium is easily oxidized in air and much cadmium is lost in the period of several hours required to dissolve the higher melting metal.

The new method which I have found most successful in the preparation of these alloys comprises the following steps: The cadmium and the higher melting metal or metals are charged together. The charge is then heated to some temperature below the boiling point of cadmium, generally between 1,000 degrees Fahrenheit and 1,200 degrees Fahrenheit, but is protected from the oxygen of the air as hereinafter set forth. The charge may then be held at this temperature until the higher melting constituent of the alloy has dissolved with little or no loss of cadmium due to oxidation or volatilization. While the melt may be protected from the oxidizing action of the air by an atmosphere of a non-oxidizing gas such as hydrogen, nitrogen, carbon dioxide, helium, or other inert gases, the preferred method is to cover the melt with a flux which is molten at the temperature at which the operation is carried out. It is essential that this flux be relatively stable when in contact with the molten cadmium in the temperature range above indicated and that the flux be of such composition that it does not add undesirable constituents to the bath or to the melt, itself. The fluxes I have used for this purpose are copper chloride or silver chloride alone, and the eutectic mixtures of the chlorides of the alkaline and alkaline earth metals together or with the chlorides of the alloying metals. Some of these eutectic mixtures are set forth in the following table, designated Table I:

TABLE I

73% calcium chloride, 27% sodium chloride.
79% cadmium chloride, 21% sodium chloride.
46% lithium chloride, 54% potassium chloride.
70% barium chloride, 30% potassium chloride.
61% calcium chloride, 39% lithium chloride.
74% strontium chloride, 26% sodium chloride.
42% calcium chloride, 58% barium chloride.
43% strontium chloride, 57% calcium chloride.
87% strontium chloride, 13% barium chloride.

These percentages of composition represent approximately the lowest melting point obtainable from the eutectic mixtures in question. These percentages may be varied more or less in small amounts without producing a flux composition having a melting temperature that is excessive for this purpose.

It is to be understood that I do not limit my invention to the method of using only the above-listed fluxes, but that any flux made of one salt alone, or two or more salts in combination is satisfactory, provided that its melting point is below the boiling point of cadmium, that it is stable when in contact with the molten cadmium, and does not add undesirable constituents to the bath or melt.

In preparing the flux, the salts should be fused together and cast into any convenient form before adding to the melt. The flux should be stored in tightly sealed containers to prevent absorption of moisture from the air.

Cadmium base alloys containing up to 10 per cent of copper, silver, nickel, or a combination of these elements were satisfactorily prepared in the above manner. The percentage of alloying element can be increased to the amount represented by the solubility constant of the particular metal in cadmium at the temperature at which the process is carried out. These percentages are:

| | Percent |
|---|---|
| Silver in silver-cadmium | 30 |
| Nickel in nickel-cadmium | 15 |
| Copper in copper-cadmium | 30 |

It was observed that as the amount of alloying elements increased, the alloys grew harder. It is therefore obvious that if an alloy of this type with greater hardness is desired, the percentage of the alloying element should be increased. Due to the relatively high melting point of these alloys, they do not flow readily under a soldering iron and their application as solder is best accomplished by the use of the gas-air torch or dip methods.

To demonstrate the superior qualities of my solders, brass strips one inch wide were soldered together in such a manner that the area of the joint was one square inch, using alloys of cadmium with nickel, copper, and silver. The soldered specimens were then sheared in a standard tension testing machine at room temperature and at 350 degrees Fahrenheit, with results given in Table II. Also given in this table are the melting points of the alloys tested.

TABLE II

*Strength of soldered joints at room temperature and at 350° F.*

| Solder used | Shearing strength | | Melting points |
| --- | --- | --- | --- |
| | At room temperature | At 350° F. | |
| | *Psi* | *Psi* | *°F.* |
| Cadmium—95%, silver—5% | 2130 | 1970 | 705–608 |
| Cadmium—99%, silver—1% | 2180 | 2205 | 630–615 |
| Cadmium—98%, nickel—2% | 1860 | 1830 | 625–201 |
| Cadmium—98%, copper—2% | 1340 | 1580 | 820–601 |
| Cadmium—97%, copper—1% Silver—1%, nickel—1% | 1315 | 1140 | 640–608 |
| Lead—50%, tin—50% | 2580 | 441 | 360 |

While I have illustrated my invention by tests on brass materials, it is understood that I do not intend to limit my invention to such use, but that the same may be used for the joining of other metals, and that I intend my invention to be limited only by the scope of the claims.

I claim:

1. As a new article of manufacture, a solder comprising any one or more of the group, copper, silver and nickel, in amounts not in excess of 30 percent copper, 30 percent silver and 15 percent nickel, and cadmium as the remainder.

2. As a new article of manufacture, a solder comprising silver ranging from small amounts to 30 percent, and the balance cadmium.

3. As a new article of manufacture, a solder comprising nickel ranging from small amounts to 15 percent, and the balance cadmium.

4. As a new article of manufacture, a solder comprising copper ranging from small amounts to 30 percent, and the balance cadmium.

5. As a new article of manufacture, a metallic article adapted to be subjected to a range of temperatures from atmospheric temperatures to 500° Fahrenheit, comprised of a plurality of rigidly connected parts, said parts being joined by means of a solder comprised of any one or more of the group, copper, silver, and nickel in amounts not in excess of 30 percent copper, 30 percent silver or 15 percent nickel, and the balance cadmium.

RICHARD R. KENNEDY.